United States Patent Office 3,245,432
Patented Apr. 12, 1966

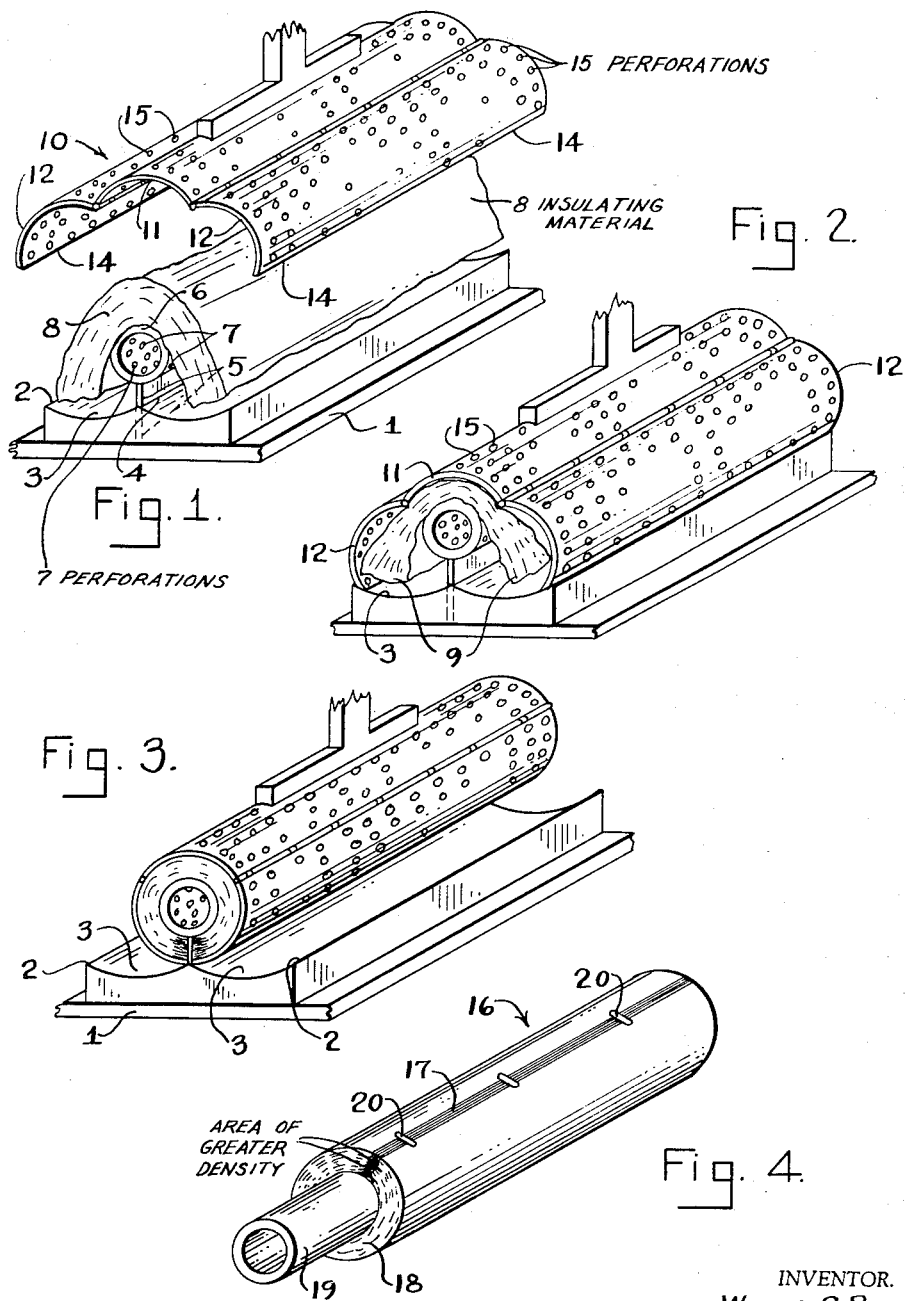

3,245,432
PIPE INSULATION
Walter G. Pusch, Somerset, N.J., assignor to Johns-Manville Corporation, New York, N.Y., a corporation of New York
Original application Dec. 9, 1958, Ser. No. 779,197, now Patent No. 3,162,895, dated Dec. 29, 1964. Divided and this application Apr. 14, 1964, Ser. No. 359,724
2 Claims. (Cl. 138—151)

This application is a division of my copending application, Serial No. 779,197, filed December 9, 1958, now U.S. Patent No. 3,162,895. This invention relates to a fully round pipe insulation. The pipe insulation is formed from any fibrous insulating material such as, asbestos, rock wool, mineral wool, glass or synthetic fiber.

It is an object of this invention to provide a fully round pipe insulation having only one longitudinal slit and which insulation is heavily densified along the longitudinal slit.

The foregoing object is accomplished in accordance with the instant invention by a press mold comprising a perforated mandrel attached to a separating wall, a three piece, perforated hinged cage and a pair of arcuate surfaced guides. The stationary portion of the mold is formed by a base having a pair of integral guides and which is provided with a slot to receive the separating wall to which is attached the perforated mandrel. The three piece, perforated hinged cage is mounted for reciprocal movement in a vertical direction. The cage has a central arcuate section which extends for approximately 120° and two arcuate hinged portions, each extending for approximately 120°. In operation, a felt of insulating material is positioned over the mandrel so that each of the free edges of the felt is adjacent to one of the curved guides. The hinged cage is lowered into contact with the felt on the mandrel and the movement thereof is continued until the central section of the felt is compressed to a predetermined thickness. The hinged arcuate portions are then moved to compress the felt against the mandrel to form the fully round pipe insulation. The guides, between which the mandrel is positioned, are shaped so that the surface contour of each of the guides facing the hinged cage is described substantially by the arc of the circle on which the hinged section pivots. In view of this definite curvature, the outer edges of the hinged sections continuously contact the surface of the guides during closure of the hinged sections as the felt is wrapped around the mandrel. This particular surface contour of the guides eliminates the need for hand-tucking and allows the felt to be compressed against the mandrel and its separating wall so that the areas of the pipe insulation bordering the separating wall are heavily densified. The apparatus thus functions to produce a fully round pipe insulation having a longitudinal slit so that the insulation may be spread apart and snapped into position around a pipe and in which the areas adjacent the closing slit are desirably more highly densified.

The invention will be more fully understood and further objects and advantages thereof will become apparent when reference is made to the following detailed description of a preferred embodiment of the invention and the accompanying drawing in which:

FIGS. 1–3 are pictorial schematic representations of apparatus functioning in accordance with the instant invention; and FIG. 4 is a pictorial view of a pipe insulation made in accordance with the instant invention.

Referring to the drawing and in particular to FIGS. 1–3, there is disclosed schematically apparatus for the press molding of fully round pipe insulation. A base 1 is provided with a pair of side guides 2 each of which has a concave arcuate surface 3. The base 1 is further provided with a longitudinally extending slot 4 between the guides 2. The slot 4 is adapted to receive a separating wall 5 to which is attached a mandrel 6 having a plurality of perforations 7. The mandrel 6 is positioned above and between the guides 2 so that a felt 8 of insulating material impregnated with a conventional unset binder may be positioned over the mandrel 6, as viewed in FIG. 2, with the free edges 9 of the felt 8 adjacent each associated arcuate surface 3. The mandrel 6 is adapted to form the male die of the press mold for forming the pipe insulation and has an outside diameter substantially equal to the outside diameter of the pipe to be insulated. The female die for the press mold consists of a hinged cage 10 having a central section 11 and two side portions 12 pivotally mounted to the central section 11 by piano hinges or the like. The central section 11 is formed as an arcuate section extending approximately 120° and having a radius of curvature which is substantially equal to the radius of the outside diameter of the finished pipe insulation. Each of the side portions 12 is formed as an arcuate section extending approximately 120° and having a radius of curvature which is substantially equal to the radius of the outside diameter of the finished pipe insulation. Thus, when the side portions 12 are closed so that the free edges 14 thereof are in abutting relationship with the separating wall 5, they cooperate with the central section 11 to form a hollow cylindrical tube having a diameter substantially equal to the desired outside diameter of the finished pipe insulation. The central section 11 and the side portions 12 have a plurality of perforations 15 therein for a purpose to be later described.

The operation of the apparatus is schematically illustrated in FIGS. 2 and 3. A felt of insulating material is positioned over the mandrel 6 so that the free edges 9 of the felt 8 are adjacent the arcuate surfaces 3 of the guides 2. The hinged cage is moved toward the mandrel 6 until the central section 11 contacts the outer surface of the felt 8. The movement of the central section 11 is continued until the felt 8 of insulating material is compressed between the central section 11 and the mandrel 6 to the thickness of the desired pipe insulation. The side portions 12 are than actuated by a mechanism, to be later described, to wrap the remaining portions of the felt 8 of insulating material around the mandrel 6. It is to be emphasized that the central section 11 should be in its final position before the side portions 12 begin to close. The path described by the free edges 14 of the side portions 12 when pivoted and the radius of curvature of the arcuate surface 3 of the side guides 2 are of a critical nature to be explained later. As the side portions 12 approach the separating wall 5, the excess amount of insulating material in said felt, as explained below, is gradually compressed between the separating wall 5, the mandrel 6, the side portion 12 and the arcuate surface 3 of the guides 2 by the action of the side portions 12 so that the areas of the insulating material adjacent the separating wall 5 are more densified than the remaining areas of the felt 8. After the side portions 12 have been closed to abut the separating wall 5, hot air is introduced to the interior of the mandrel 6 to cure the unset binder in the felt of insulating material and thus form the final pipe insulation which is then removed from the mandrel 6 by a conventional practice.

In the apparatus illustrated in FIGS. 1–3 it should be particularly noted that the radius of curvature of the arcuate surface 3 of the guides 2 is that described by the radius on which the side portion 12 are pivoted. Thus, the radius of curvature of each surface 3 of the side guides 2 is defined by the path followed by the free edge 14 of the side portion 12 when moved to a closed position against the separating wall 5. As each side portion 12 moves toward the separating wall 5, as viewed in FIGS. 2 and 3, the free edge 14 thereof is thus at all times substantially in contact with the arcuate surface 3 of the adjacent side guide 2. In this manner, the felt 8 of insulating material is continuously contained within the area defined by the arcuate surface 3, the separating wall 5, the mandrel 6 and the associated side portion 12. It is, therefore, deemed essential that the free edge of each side portion substantially contact the arcuate surface of the associated guide continuously during the formation of the pipe insulation.

In FIG. 4 there is illustrated a finished pipe insulation 16 made in accordance with the instant invention. The pipe insulation 16 is fully round and has a longitudinal slit 17 so that the pipe insulation may be spread open along the slit and snapped into position around a pipe. The main body 18 of the pipe insulation 16 is of generally homogeneous density. As the area along the longitudinal slit 17 is approached, the pipe insulation becomes more dense until the area immediately adjacent the longitudinal slit 17 is reached wherein the density of the pipe insulation is substantially greater than the density at other areas. This highly densified area presents a strong surface that is not readily ruptured as the insulation is opened and snapped into position around the pipe 19. The inherent resiliency of the pipe insulation retains the adjacent densified edges of the pipe insulation in abutting relationship. If desired, a more positive securement may be provided by inserting a plurality of positive closures 20 bridging the slit 17 at spaced intervals.

Successful operation was accomplished with apparatus designed to form 12" outside diameter pipe size, 2" thick mineral fiber pipe insulation from pre-cut felts wherein the pipe insulation has an inside diameter of about 12" and an outside diameter of about 16". The apparatus consisted on a base 1 which supported a horizontally positioned forming mandrel having an outside diameter of 12" perforated by 1/8" holes on 1/4" staggered centers, on a dividing wall in a 1/2" wide slot located between a pair of side guides 2. A mineral fiber felt, 6" thick, and containing unset binder, was trimmed to 40" in the direction of axial length of the finished pipe insulation and a width of 50". The mineral fiber felt is thus formed into a block having a width of 50" and a thickness of 6". In its finished cylindrical form, the outer circumference of the pipe insulation corresponding to one surface of the block formed from the mineral fiber felt is about 50" while the inner circumference of the pipe insulation corresponding to the other surface of the block formed from the mineral fiber felt is about 38". Thus, when in block form there exists at each side of the mineral fiber felt a wedge of excess mineral fiber having a triangular cross-sectional configuration with sides of about 6 x 6 x 8.5". It is this excess portion of mineral fiber which is compressed to form the side edges of heavier density adjacent the longitudinal slit 17 of the pipe insulation 18. The outer cage was contained within a movable frame and consisted of metal arcuate portions, all perforated with $3/32"$ holes on $5/32"$ staggered centers, the side portions being hinged longitudinally at the edges of the center section 11 which was rigidly positioned so that when the hood was lowered there would be a 2" separation between the mandrel and the cage. The two hinged portions 12 of the cage were attached to pressure cylinders so that they could be brought into final position to hold the mineral fiber felt while the binder therein was cured by passing hot air into the perforated mandrel and outwardly through the felt. A pipe insulation having a density of 6.6 p.c.f. was satisfactorily cured with 500° F. air in 2 minutes. The differential pressure in the system varied from 6.8 to 7.6 inches of water. The above is given for illustration only and it is to be understood that all sizes of pipe insulation for 3/8" to 32" outside diameter pipe with wall thicknesses from 1/2" to 3" can be successfully made on apparatus similar to that described above.

While the invention has thus been described in rather full detail, it will be understood that these details need not be strictly adhered to and that various changes and modifications may suggest themselves to one skilled in the art, all falling within the scope of the invention as defined by the subjoined claims.

What I claim is:

1. A circular pipe insulation having a longitudinal slit formed therein so that said insulation may be spread apart along the slit and snapped into position around the pipe, said pipe insulation comprising a felt of insulating material having a main body of substantially uniform density and side sections bordering said longitudinal slit, said side sections being of substantially higher density than said main body so that said pipe insulation will not rupture when spread open along said slit, said side sections being of generally triangular cross-sectional configuration with the maximum circumferential extent of said side sections being adjacent the inner surface of said pipe insulation, and said felt having substantially the same radial thickness throughout its circumferential extent.

2. A circular pipe insulation as in claim 1 wherein said side sections are integral with said main body.

References Cited by the Examiner
UNITED STATES PATENTS

| | | | |
|---|---|---|---|
| 231,832 | 8/1880 | Merriam | 138—141 |
| 1,489,693 | 4/1924 | Brookby | 138—149 |
| 1,790,178 | 1/1931 | Sutherland | 161—118 X |
| 1,860,203 | 5/1932 | Rishel | 138—141 |
| 2,000,769 | 5/1935 | Mansur | 161—149 X |
| 2,089,087 | 8/1937 | Fletcher | 161—147 |
| 2,778,759 | 1/1957 | Stephens et al. | 138—156 |
| 2,784,129 | 3/1957 | Stephens | 138—155 X |
| 3,053,715 | 9/1962 | Labino | 138—141 |

LAVERNE D. GEIGER, *Primary Examiner.*

LEWIS J. LENNY, *Examiner.*